(12) United States Patent
Romashkin (10) Patent No.: US 9,684,010 B2
(45) Date of Patent: Jun. 20, 2017

(54) SCREEN-LESS BALLISTIC CHRONOGRAPH

(71) Applicant: Pavel Romashkin, Longmont, CO (US)

(72) Inventor: Pavel Romashkin, Longmont, CO (US)

( * ) Notice: Subject to any disclaimer, the term of this patent is extended or adjusted under 35 U.S.C. 154(b) by 0 days.

(21) Appl. No.: 13/902,761

(22) Filed: May 24, 2013

(65) Prior Publication Data

US 2014/0347675 A1    Nov. 27, 2014

(51) Int. Cl.
*G01B 11/14* (2006.01)
*G01P 3/68* (2006.01)

(52) U.S. Cl.
CPC ................... *G01P 3/685* (2013.01)

(58) Field of Classification Search
CPC ...... G01C 3/08; G01B 11/026; G01B 11/002; G01B 11/14; G01S 5/163; G01S 5/16
USPC .................................. 356/600–614
See application file for complete search history.

(56) References Cited

U.S. PATENT DOCUMENTS

| | | | | |
|---|---|---|---|---|
| 3,487,226 A * | 12/1969 | Conner | ...................... | F41J 5/02 250/222.1 |
| 3,807,858 A | 4/1974 | Finch | | |
| 4,188,544 A * | 2/1980 | Chasson | ............ | G01B 11/2504 144/357 |
| 4,204,683 A | 5/1980 | Filippini | | |
| 4,239,962 A | 12/1980 | Oehler | | |
| 4,837,718 A | 6/1989 | Alon | | |
| 4,845,690 A * | 7/1989 | Oehler | .................... | G04F 10/00 324/178 |
| 5,056,922 A * | 10/1991 | Cielo | .................. | G01B 11/245 356/3.06 |
| 5,946,645 A * | 8/1999 | Rioux et al. | .................. | 702/155 |
| 5,988,645 A | 11/1999 | Downing | | |
| 6,020,594 A * | 2/2000 | Tschudi | .................. | G01P 3/685 250/221 |
| 6,102,291 A * | 8/2000 | Mazzone | ............... | G01B 11/00 235/462.01 |

(Continued)

OTHER PUBLICATIONS

Pinezich, J. D. et al., 2010, "Ballistic Projectile Tracking Using CW Doppler Radar," Aerosp. and Elect. Syst., IEEE Transactions, vol. 46, No. 3, p. 1302-1311,TAES.2010.5545190.

(Continued)

*Primary Examiner* — Tarifur Chowdhury
*Assistant Examiner* — Isiaka Akanbi
(74) *Attorney, Agent, or Firm* — John A. Arsenault; Daniel Dubuisson; Wessels & Arsenault, LLC (57) ABSTRACT

An apparatus and method for detecting a moving object as it passes through a light curtain generated by one or more emitters, by the means for detecting the light of the light curtain reflected by the passing object onto a photoelectric detector. The object sensing area is not constrained by mechanical means and is limited only by the light curtain shape. Velocity of the object is determined primarily by dividing the known distance between two or more parallel light curtains by the time of passage between the light curtains. Additional velocity measurement obtained from the known object length divided by the time of its passage through the light curtain allows verification of the primary velocity measurement. Direction of the object motion across the sensitive area is determined by implementing two or more uniquely identifiable, closely spaced parallel light curtains, and corresponding uniquely identifiable detectors.

20 Claims, 4 Drawing Sheets

(56) References Cited

U.S. PATENT DOCUMENTS

| | | | |
|---|---|---|---|
| 7,084,989 B2* | 8/2006 | Johannesson | G01B 11/046 356/601 |
| 7,701,558 B2 | 4/2010 | Walsh | |
| 8,265,375 B2* | 9/2012 | Shirley | 382/154 |
| 8,432,377 B2* | 4/2013 | Newton | 345/175 |
| 8,441,705 B2 | 5/2013 | Lukic | |
| 8,599,367 B2* | 12/2013 | Canham | 356/5.01 |
| 2002/0024677 A1* | 2/2002 | Metcalfe | G01B 11/245 356/625 |
| 2002/0036779 A1* | 3/2002 | Kiyoi et al. | 356/606 |
| 2008/0273211 A1* | 11/2008 | Schmitt | G01B 11/245 356/611 |
| 2011/0268344 A1* | 11/2011 | Chan | G01N 21/9505 382/145 |

OTHER PUBLICATIONS

Feller W., An Introduction to Probability Theory and Its Applications, vol. 1, 3rd ed. p. 174, New York: Wiley, 1968, ISBN-10: 047125.
Standard Table for Reference Solar Spectral Distributions: Direct and Diffuse, http://www.astm.org/Standards/G197.htm.
OSHA Technical Manual (OTM), Section III, Chapter 6: Laser Hazards, http://www.osha.gov/dts/osta/otm/otm_iii/otm_iii_6.html.

* cited by examiner

SCREEN-LESS BALLISTIC CHRONOGRAPH

STATEMENT REGARDING FEDERALLY SPONSORED RESEARCH AND DEVELOPMENT

Not Applicable.

FIELD OF THE INVENTION

This invention relates to detection of moving objects in space, specifically toward detection of projectiles for the purpose of measuring projectile velocity.

RELATED APPLICATION

This application is related to U.S. Provisional Patent Application Ser. No. 61/652,556 titled "Screen-less ballistic chronograph," filed on May 29, 2012, the complete subject matter of which is incorporated by reference herein in its entirety.

DISCUSSION OF RELATED ART

Devices for measuring projectile velocity (known as chronographs) have been available to consumers for many years. Such instruments are in demand by hunters, competitive shooters, law enforcement professionals, and powder, bullet and ammunition manufacturers. Projectile velocity measurements enable these users to develop high performance, consistent ammunition while maintaining safety, preventing potential injury from excessively "hot" loads.

There are several well-known and previously documented methods for measuring projectile velocity. Some, such as projectile Doppler radars (for example, U.S. Pat. No. 4,837,718, Yair Alon, 1989), are only available to the military and large companies due to their size, complexity and high cost. Even with the recent arrival of newer technologies such as MagnetoSpeed (http://www.magnetospeed.com/), there is essentially only one general design of chronograph that is commonly available to general public at the present time. It is a design similar to that clearly described by FIG. 1 in Oehler, U.S. Pat. No. 4,239,962 (1980), based on the detection of a decrease of light intensity caused by the passage of a projectile while it is moving along a trajectory through a system of two or more light-sensitive "screens." The velocity of the projectile is obtained by measuring the amount of time that it takes for the projectile to pass across a known distance between the "screens". Such screens are equipped with sensors capable of detecting the ambient light intensity reduction as the projectile shadow crosses the evenly illuminated "screens". Electronic timers measure the time between the projectile's passage from the first screen and to the second (or third) screen.

This design has been in widespread use since at least early 1980s and has not changed significantly over time. Continuing evolutionary technological improvements helped refine the design, including the addition of infrared lighting of the screens and addition of "proof screens" (U.S. Pat. No. 4,845,690, Oehler, 1989) to help reduce the likelihood of erroneous readings.

One inherent weakness of this design is the poorly resolved shape and low intensity of the signal produced by the light-sensitive screens. The optical sensors receive diffused light from an area of the upper screen cover that is so much larger than the relative size of the projectile shadow that reliable detection of the moment when the projectile enters the screen is very challenging. For example, a chronograph screen with the dimensions of 1.5×14 inches has an area of 21 square inches, while the shadow of a .22 caliber bullet may be as small as 0.25×0.22 inches and has the area of 0.055 square inches. Even in the best case the shadow would cause a light intensity change of only 0.26%; however, the shadow is never completely black and the actual light intensity decrease at the detector is likely less than half of that value, or 0.13%. Such minute changes in light intensity may be on the same order as random changes of the ambient light intensity and are difficult to detect electronically, therefore it is not uncommon for such designs to miss a projectile passage, resulting in failed velocity readings.

Diffused nature of the shadow further complicates the detection process because the light intensity change is not abrupt and does not have a well-defined start and end. Instead, the intensity change has a gradual increase and decrease resulting in a bell-shaped intensity change (commonly referred to as a Gaussian, or normal, distribution, a very common statistical representation described on p. 174 in Feller, 1968 and multiple other sources). The Gaussian shape of the intensity change requires the use of a complex algorithm or specialized hardware in order to obtain the equivalent time of the projectile passing through the first and the second (and third, if any) screen, which may produce a slightly different Gaussian shaped signal. The variation in shape of the light intensity change signal can be a source of either a systematic or random measurement error when the light intensity change is interpreted by the electronic circuitry.

Other prior art, for example Downing, U.S. Pat. No. 5,988,645 (1999), utilizes more recent developments in planar light sources for projectile detection. They use a plurality of light sources and detectors installed onto a frame through which a projectile passes. These designs may have a well-defined signal shape because the passing projectile interrupts the light from a relatively intensive light source incident upon a sensitive photodetector. However, the embodiment of these designs still requires installation of frame-like hardware in the immediate proximity of the projectile path. This may result in damage to the hardware by the bullet, projectile ricochet in an unintended direction and subsequent bodily injury or property damage.

The more recent advancements in the consumer chronograph technology lie in the area of magnetic detection of projectile passage and resultant velocity calculation (e.g. MagnetoSpeed, http://www.magnetospeed.com/). This approach to projectile detection avoids the placement of fragile hardware near the bullet path. However, the signal shape from the bullet passing over a number of inductive coils typically used in a magnetic projectile detector is inevitably Gaussian, necessitating statistical assumptions in the signal processing algorithms. Further, this technology is not well presented in literature and uncertainty analyses of the velocity measurement using this methodology are not available. Importantly, the magnetic projectile detector device must be placed as parallel as possible and as close as practical to the bullet path in order to maximize the inductive signal. In practice this leads to the attachment of the detection hardware to the barrel of the firearm. Such attachment inevitably changes the barrel balance and, consequently, barrel harmonics during the firing, and may alter the point of impact on the target, causing misleading results during the evaluation of ammunition performance.

Utilization of emitted light, and in particular, reflected emitted light for projectile detection had been suggested in the past (for example, in U.S. Pat. No. 3,807,858, Finch, 1974; U.S. Pat. No. 4,204,683, Filippini, 1980), however for an entirely different purpose of detecting the position of projectile impacting on the target. Further, these designs were complicated and have not been placed into widespread public use.

Separate elements of the design utilized in the present invention have also been published in the past. Linear laser sources utilized in the current invention are widely used in construction industry and for marking of straight lines on surfaces (for example, U.S. Pat. No. 8,441,705, Lukic, 2013); for reading bar codes in retail stores and a variety of other daily applications; for pointing at objects using handheld laser pointers. Optical detection systems similar to that utilized in the current invention are typically used in LIDARs for detecting motion of dust particles or insects in the atmosphere (for example, U.S. Pat. No. 7,701,558, Walsh, 2010) for the purpose of measuring the velocity and direction of air motion, or for detecting the shape and size of cloud particles. The current invention applies a combination of these existing technologies for a different and unusual purpose of detecting projectile velocity in a simple device, which is easy to manufacture and provide to the public for an improved experience when measuring the velocity of a ballistic projectile.

Summarily, all of the chronograph designs in the prior art suffer from a number of inherent disadvantages:

a) The detection apparatus used in the prior art is mechanically complex and consequently costly to manufacture, complicated to use and may easily brake, requiring expensive repairs. Some designs consist of a fairly fragile screen assembly or a frame, which is comprised of side panels, a screen at the top and a base with one or more optical electrical sensors, which detect the passing of the projectile through the opening of the screen as a measure of disruption of light intensity of the screen or the interruption of illumination by the light from the source incident upon the detectors. Other designs consist of a mechanical protrusion attached to the muzzle end of the barrel of a firearm, which needs to be able to withstand muzzle blast and heat from the firing without losing alignment with the barrel or failing to operate under the harsh conditions of being in the immediate proximity to the escaping gases generated by the burning powder charge.

b) The practical field use of a screen-based chronograph is inconvenient. The size and ruggedness of the screens have to be a compromise between reliability, usability and safety. The screens have to be large enough so that their parts can be kept out of the way of the projectile and the muzzle blast when the firearm is fired. If the screens are too large, the detectors fail to detect the projectile shadow reliably and the screens are too bulky for convenient use. If the screens are small enough to be convenient to install at a shooting station, it is difficult to align them with the barrel of the firearm and with the target (an example of such alignment is shown in Oehler, U.S. Pat. No. 4,239,962). It is not an infrequent occurrence during use that the screens are hit by the bullet, causing expensive damage to the chronograph. In any case the screens require the user to bring and install extra equipment, such as tripods, stands or other mounting devices that enable the installation, alignment and leveling of the screens at the shooting station.

c) The screens have to be strong enough to withstand handling during field use, yet frangible so that their fragments don't cause bodily harm if the assembly is accidentally hit by the projectile. The possibility of a bullet ricochet from the screen parts is a great concern because it can compromise the shooter's or bystanders' safety.

d) The screens can be blown apart by the muzzle blast of the firearm, in which case the reading of projectile velocity is not obtained and the user is forced to re-assemble the screens, sometimes requiring spare parts to be kept on hand. Coincidentally, screen parts are damaged so frequently that they are offered for sale separately by chronograph manufacturers.

e) The detectors used in the chronographs in the prior art are highly sensitive to the level of ambient light in the immediate environment. While some manufacturers' screens are more reliable than others, they all can fail to detect a projectile in direct sun light conditions. Insufficient (evening or morning) light or installation under a covered shooting station with a dark colored roof can also cause problems with the detection of a projectile shadow.

f) The screens can be installed only a short distance from the muzzle of the firearm but not too close, or, in rare instances, near the target. Measuring bullet velocity tens or hundreds of yards from the muzzle is completely impractical with the screened chronographs due to the difficulty of setup and alignment of the screens.

g) Screens in current designs are connected by wires to a processing unit. The wires can break or tangle during field use and limit the distance at which the screens can be installed from a shooting station. This limitation typically forces the chronograph to be installed immediately in front of the shooting station and to provide only the measure of the muzzle velocity. Additional screens connect with yet more wires, making multiple screen chronographs cumbersome and difficult to install at the shooting station.

h) A number of difficulties accompany the use of a magnetic chronograph design as well. A magnetic chronograph has a magnetic detector assembly that needs to be fastened to the barrel of the firearm, making it practically impossible to use with short barrel firearms, such as small revolvers. Further, such magnetic detector cannot be attached to semiautomatic pistols, which have a moving slide covering the barrel, unless the pistol is equipped with a mounting rail. This is an important limitation because many users, such as government agencies, require testing the velocity of ammunition used in semiautomatic pistols. Further, a magnetic detector cannot be easily installed onto firearms equipped with muzzle brakes, such as military sniper rifles, for which velocity measurements are particularly important. Even when such a chronograph can be fastened to a longer barrel of, for example, a rifle, the attached magnetic detector may shift from the act of the firing of the gun, cause false readings and need to be straightened it before firing again.

i) If parts of the chronograph are attached to the barrel of the firearm, the point of impact of the bullet on the target may change significantly, compromising the results of the ammunition evaluation, even if the velocity is measured accurately. This is not an acceptable consequence because projectile velocity, velocity stability, and accuracy are all important and are evaluated equally and simultaneously during ammunition evaluation.

j) All of the current designs available to the public incorporate velocity calculating electronics and the means of showing the velocity calculations to the user in the dedicated circuitry built into the chronographs. This leads to higher cost and greater complexity of the chronograph because every unit must include a processor, a display, and sometimes a miniature printer for delivering the data to the user. Any improvements to the velocity calculating algorithms for such chronographs necessitate additional circuitry to enable firmware updates in the best case, or even shipping of the chronograph to the manufacturer for expensive upgrades. Such routine tasks as saving the velocity data from a chronograph onto a personal computer still usually require connecting the chronograph by a cable to be read by specially designed software.

The multitude of issues disclosed herein from the current state of the art results in frustration, difficulty of use, and additional expense to the users of current chronographs, and can even limit the usability of existing chronograph designs in some important applications.

SUMMARY OF THE INVENTION

The invention, a screen-less chronograph, generally comprises a source of light, such as a linear laser or other linearly collimated light source, and a detector located near the light source. The light emitted from the linear light source forms a "light curtain" or a "light fan" that is oriented perpendicularly or at a known angle to the projectile flight path. A photoelectric detector is further installed in the proximity of the light source. As a projectile passes across the light curtain it reflects some of the light from the source, which at this time is detected by the photoelectric sensor.

Two or more such light source and detector pairs can be positioned a known distance apart (for example 0.5 m) to form a velocity measuring apparatus. When the detectors detect the reflected light from the passage of a projectile they send an electrical signal to an electronic timer circuit. Such circuits are common industrial designs and usually include, for example, a high frequency, low-drift crystal oscillator to produce a highly stable series of electrical pulses with a known period; a gate, which will open and pass through the pulse stream at the time when the bullet crosses the first light curtain and close and stop the pulse stream when the bullet crosses the second light curtain; and a microcontroller or pulse counter, which will count the number of pulses triggered to be recorded by the gates, and determine the time of bullet passage as the product of the number of pulses and the known period of the oscillator. The apparatus can at this point calculate the velocity by dividing the known distance between the light curtains by the measured time that it takes for the projectile to pass between the light curtains.

Additionally, the duration of time during which the projectile is illuminated by the light curtain can be recorded and later output on a device or computer. Such time measurement would start at the moment when the projectile is first illuminated by the light curtain and end at the moment when the projectile exits the same light curtain. By dividing a known projectile length by this time, an independent measure of projectile velocity can be obtained. This measurement is less accurate than the measurement of time over the longer passage of the projectile between the first and subsequent light curtains but it can be used to augment the more accurate measurement or to provide a measurement of velocity when only one light curtain can be practically installed, for example in the middle of the shooting range to measure velocity of the projectile at a substantial distance from the muzzle of the firearm.

Notably, the capability to measure velocity by a single light curtain afforded by the current invention is impossible in principle in any other existing consumer optical chronograph design because the ambient light change in these designs is detected over a screen that is larger than the projectile length.

A preferred embodiment of the current invention includes further simplification of the basic chronograph design. The number of pulses that define the time of projectile passage from the first light curtain to the second light curtain and recorded by the microcontroller or counter can be wirelessly transmitted from the chronograph, for example using WiFi, Bluetooth® (802.11 and IEEE 802.15.1 wireless connections, respectively), or other common wireless consumer technology. Said data transmission can be received by a user's data processing and display device such as a portable computer, tablet computer, a smart phone or a similar device. The pulse count information can be processed by an app on the user's device and may be saved in a file or database; e-mailed; printed out; or sent to a remote server at the discretion of the user. All this functionality and information can be delivered to the user as a software application that can be upgraded, updated and enhanced, and delivered to the user through the Internet without necessitating costly and complicated upgrades to the hardware of the chronograph itself. The data processing and storage capabilities of portable consumer computers and smart phones allow to provide the user of the chronograph with features that, if added to a standalone chronograph, would result in an impractically high cost of such device. Furthermore, visibility and image quality of the screen of portable consumer computing devices are far superior to those of the small liquid crystal displays usually installed in hardware used in the outdoors, such as ballistic chronographs. Providing the chronograph data on the colorful and bright screen of a familiar everyday device would result in an overall better experience for the user of the chronograph.

In most cases a chronograph would be installed immediately in front of the muzzle of the firearm to measure muzzle velocity, which is the key value used for evaluating ballistic performance of firearms and ammunition. However, individual light curtains or pairs of light curtains from the current invention can be conveniently installed downrange from the shooter, providing bullet velocity measurements away from the muzzle. Such measurements are valuable to both individuals and ammunition manufacturers because they provide a way to verify the projectile ballistic coefficient and fine tune projectile shape during the development process. The simplicity of the screen-less detectors; the lack of need to precisely align their light curtains with the bullet trajectory (the only requirement is that the light curtains are close to being perpendicular to the bullet path); and their wireless communication with the user's display device make downrange measurements of velocity convenient and economical because the additional data from the extra light curtains can be processed by the same software on the user's tablet computer or smart phone, without the need to add such algorithms to the hardware of the chronograph itself.

To accomplish these and other goals, the inventor contemplates a unique projectile detection and velocity measurement apparatus.

An object of the present invention is to provide a mechanically simple projectile detection apparatus by eliminating the need for mechanical screen components.

It is another object of the present invention to eliminate the possibility of expensive damage to the chronograph, bodily harm to the user, or property damage potentially caused by projectile ricochet from the mechanical parts of the screen, by eliminating all the mechanical parts used in a screen.

An additional object of the present invention is to simplify use of the chronograph by eliminating the need for the assembly of a screen component and eliminating the need for careful alignment of the screens with the barrel of the firearm and target.

Still yet another object of the present invention is to eliminate the possibility of mechanical damage to the chronograph caused by the muzzle blast of a projectile firing.

Another object of the present invention is to allow installation of detectors as close to the muzzle or as far from the muzzle as the user desires to allow velocity measurements at any point along a projectile's trajectory.

Another object of the present invention is to reduce sensitivity of projectile detection to the quality of ambient light.

Another object of the present invention is to improve reliability of projectile detection by utilizing artificial light for projectile illumination.

An additional object of the present invention is to reduce the cost of components used to manufacture a chronograph, making it more affordable to the general public.

Another object of the present invention is to provide a redundant measurement of bullet velocity as the result of projectile passage through a single light curtain, improving the accuracy and reliability of the measurements.

Yet another object of the present invention is to move the processing of velocity measurement from the chronograph onto a computing device that the user already owns, reducing the cost of the chronograph and improving the user convenience.

Embodiments will include one, more, or any combination of all of the features listed above.

Other features and advantages of the present invention will become apparent from the following more detailed description, taken in conjunction with the accompanying drawings, which illustrate, by way of example, the principles of the invention.

DETAILED DESCRIPTION OF THE INVENTION

Illustrative embodiments of the invention are described below in the accompanying Figures. The following detailed description provides detailed schematics for a thorough understanding of and an enabling description for these embodiments. One having ordinary skill in the art will understand that the invention may be practiced without certain details. In other instances, well-known structures and functions have not been shown or described in detail in order to avoid unnecessarily obscuring the description of the embodiments.

Figure 1:
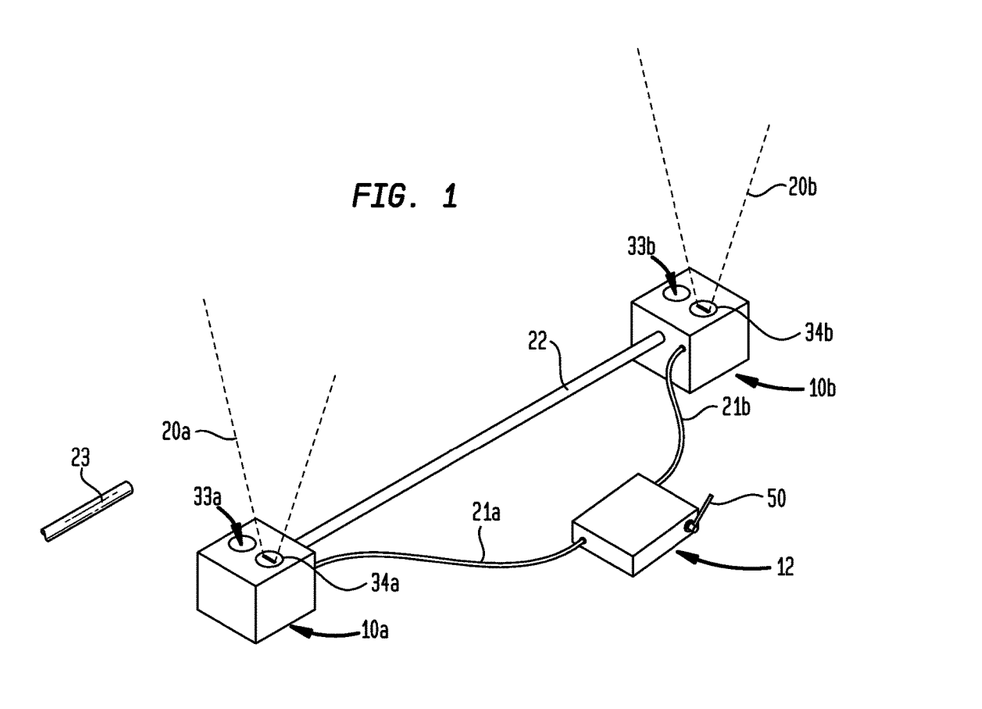
FIG. 1 is a perspective view of the preferred embodiment of the invention showing the assembly of a ballistic chronograph utilizing two light curtain detectors.

A perspective view of the preferred embodiment of a screen-less chronograph utilizing two light curtains is shown in FIG. 1. The chronograph generally comprises two light curtain generator and detector assemblies 10a and 10b respectively, which are either connected together using a rod or arm of a known length 22, or otherwise installed at a known distance from each other. The body assemblies 10a and 10b are oriented such that the planar light curtains 20a and 20b projected from the light curtain generators 34a and 34b, respectively are parallel to each other and extend in the same direction (for the purpose of this example, upward, but can be also pointing downward or sideways). The photodetector assemblies 33a and 33b, and the light curtain generators 34a and 34b installed within the body assemblies 10a and 10b are further electronically connected to the electronics assembly 12 using signal wires, optical fibers or other conductors 38 (FIG. 2), and power wires 39 (FIG. 2), contained within the conductors 21a and 21b.

In an alternative embodiment of the current invention the rod or arm 22, the electronics assembly 12 and the body assemblies 10a and 10b can be combined into a single unit, with the body of the electronics assembly 12 serving as the structural component used to position the light curtain generators 34a,b a known distance apart. In such case the conductors 21a and 21b can be enclosed within the body of the electronics assembly. The connecting rod 22 in any of its implementations is oriented as close to parallel as possible, and forward of the muzzle of, and below or to any side of, the axis of the barrel of a firearm 23 from which the projectile is going to be fired.

Figure 2:
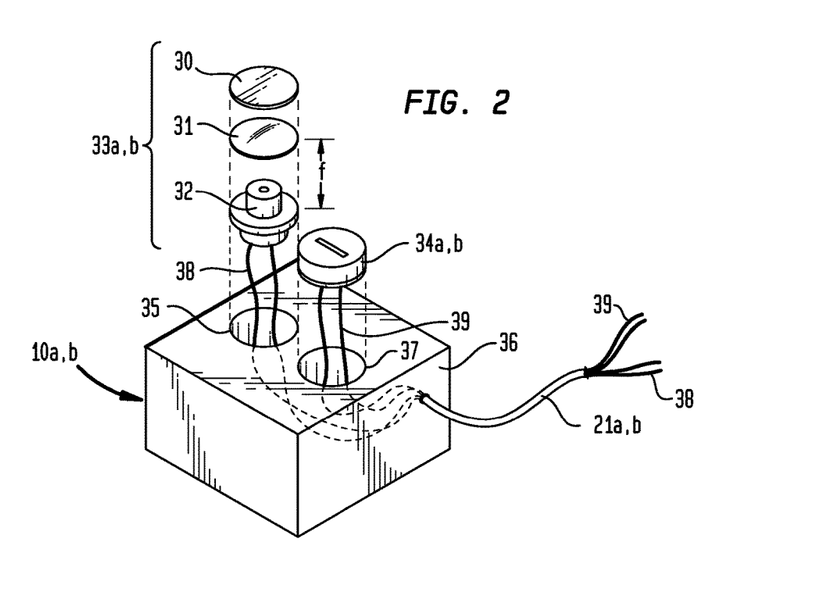
FIG. 2 is an exploded view of a light curtain generator and detector assembly of the preferred embodiment of the ballistic chronograph.

FIG. 2, an exploded view of a light curtain generator and detector body assembly 10a or 10b, shows a light curtain generator 34a,b; photodetector assembly 33a,b comprised of a photodetector 32 installed in the focal point of a focusing lens 31 with a focal length f; and an optional optical bandpass filter 30. The light curtain generator 34a,b typically would be a commercially available lens-based laser line generator but can also be another kind of continuous or scanning linear light generator such as a collimated non-laser light; or a prism or vibrating mirror laser line generator; or light emitting diode linear light source. The photodetector 32 can be a commercially available photodiode, a phototransistor, a photoresistor, a cold cathode detector, a CMOS detector, or another light detecting device. The optical bandpass filter 30 is a commercially available bandpass glass or polymer plate that allows to limit the spectrum of light passing through it, which reaches the photodetector 32, to only the part of the spectrum emitted by the light curtain generator 34a,b. Limiting the spectrum of the light incident upon the detector to the wavelength specific to the light curtain generator provides the benefit of increasing the detector sensitivity to the light reflected by the bullet by filtering out the ambient light that is irrelevant for the measurement.

Figure 3:
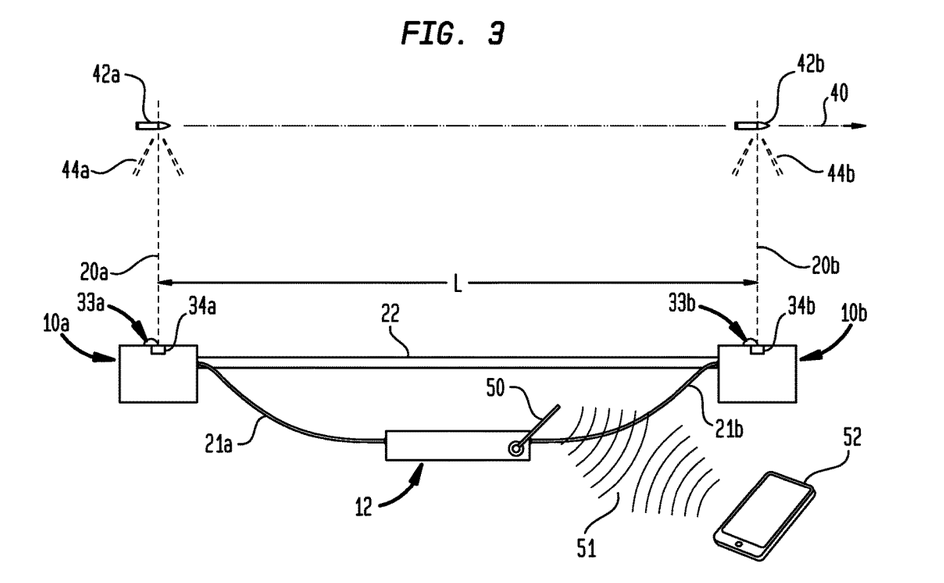
FIG. 3 is a side view of the preferred embodiment of the ballistic chronograph.
Figure 4:
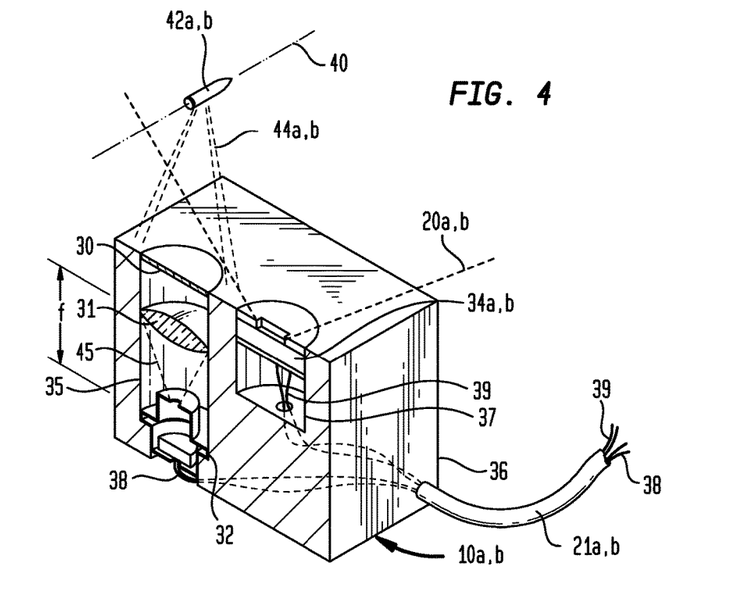
FIG. 4 is a cutaway view of the light curtain generator and detector assembly showing the arrangement of internal components and illustrating the paths of the light inside the detector assembly.

The light curtain generator 34a,b is mounted on the same side of the housing 36 as the detector assembly 33a,b. The exact relative position of the annular opening 37 for the light curtain generator 34a,b with respect to the opening 35 for detector assembly 33a,b is not critical for the purpose of the current invention as long as the detector assemblies 33a,b are reasonably exposed to the light 44a,b reflected by a passing projectile 42a,b (FIG. 3). FIG. 2 and FIG. 4 of the preferred embodiment illustrates one possible position of the annular opening 35 for the detector assembly 33*a,b* in alignment with the similar opening 37 for the light curtain generator 34*a,b* and the corresponding plane of the light curtain 20*a,b*.

In an alternative embodiment of the screen-less ballistic chronograph, a single detector assembly 33*a* or 33*b* can be installed in such a way as to be able to detect the reflected light 44*a,b* from either light curtain 20*a* or 20*b* (FIG. 1, FIG. 3). In such embodiment the detector assembly 33*a/b* would be likely installed between the light curtain generators 34*a* and 34*b*, and could be equipped with a convex lens in order to receive reflected light 44*a* and 44*b* from both light curtains 20*a* and 20*b*.

In an alternative embodiment of the light curtain generator and detector assembly some or all of the principal components of the detector assembly 33*a,b* may be combined into an industry standard assembly, for example it is conceived that the photodiode 32 may be combined with the focusing lens 31 and/or the optical filter 30 components in a single unit. Similarly, linear light sources are available commercially that include both the source of light and a photodetector on a single chip, which may further yet simplify the improved chronograph design. One ordinarily skilled in the art will be able to choose the appropriate components and build the present invention with the level of component integration afforded by the technology of the day.

The body housing 36 can be made from any suitable material capable of holding the internal components in the necessary alignment; in the preferred embodiment either a metal, alloy, or plastic are suitable. Utilizing plastic for the construction of the body 36 would provide the additional benefit of reduced costs and easier manufacturing. In an alternative embodiment, the body 36 may be combined with the body of the electronics assembly 12 (FIG. 1) and connecting rod 22 (FIG. 1) to house all of the components of the chronograph in a single sturdy unit.

FIG. 3 is a side view of the screen-less chronograph, illustrating the relative positioning of the light curtain generator and detector body assemblies 10*a* and 10*b* with regard to a projectile passing from the left to right through positions 42*a* and 42*b*, successively, and that projectile's path or trajectory 40. Light curtains 20*a* and 20*b* emitted from the light curtain generators 34*a* and 34*b*, respectively, are positioned parallel to each other a known distance L apart, and perpendicular to the projectile trajectory 40 and the plane of the drawing. Projectile 42*a* illustrates the projectile position at the moment of crossing of the first, or entry, light curtain 20*a*. The second projectile 42*b* reference number illustrates the projectile position at the moment of crossing of the second, or exit, light curtain 20*b*. The light curtain generator and detector assemblies 10*a* and 10*b* are connected by the rod, or arm, 22, but can also be secured to a surface or otherwise held in such a way that the light curtains 20*a* and 20*b* are positioned a known distance L apart and parallel to each other. Light shown as 44*a* and 44*b* is the light reflected by the projectile at the positions 42*a* and 42*b* at the time of crossing the entry light curtain 10*a* and the exit light curtain position 10*b*, respectively. The reflected light 44*a* and 44*b* is received by the detector assemblies 33*a* and 33*b*, respectively, which are accordingly mounted in the body assemblies 10*a* and 10*b* in the preferred embodiment. Assemblies 33*a*, *b* could be placed elsewhere in an alternate embodiment as long as they are reasonably well exposed to the reflected light 44*a,b*. Conductors 21*a* and 21*b* connect the light curtain generators 34*a* and 34*b*, and detector assemblies 33*a* and 33*b*, with the electronics assembly 12. The electronics assembly 12 utilizes an antenna 50 and a wireless communication module 68 (FIG. 5) to relay the projectile flight time and other information via a wireless signal 51 to a remote wireless receiver 52. The remote wireless receiver 52 can be a smart telephone, a portable computer, a tablet or another device capable of running software for calculating the projectile velocity from the data received from the electronics assembly 12.

FIG. 4 depicts a cutaway view of the light curtain generator and detector assembly 10*a* or 10*b*. The projectile 42*a* or 42*b* is shown located on the projectile trajectory 40 at the moment of the crossing the corresponding light curtain 20*a* or 20*b*. The light from the light curtain generator that is reflected by the projectile is shown as 44*a,b*. The optical bandpass filter 30, focusing lens 31 and photodetector 32 are arranged in such a way that the light sensitive element 33 of the photodetector is located a focal length f below the lens 31. Signal conductors 21*a* or 21*b* are connected to the photodetector 32. The components are held in accurate alignment by the body 36, which is made of any suitable material such as a metal or polymer. Light 45 incident upon the photodetector 32 is the light 44*a,b* filtered by the bandpass filter 30, and focused by the lens 31 to a small area in order to increase the light intensity at the photodetector sensor, which typically has a small area of a few square millimeters.

Figure 5:
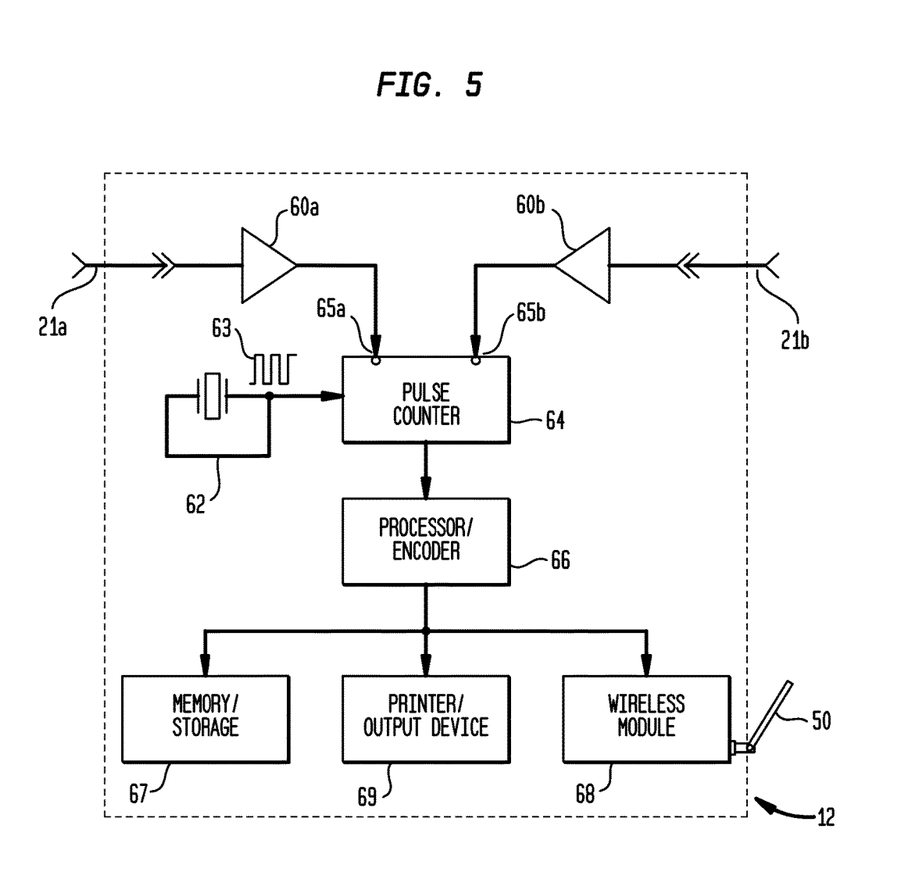
FIG. 5 is a block diagram of the signal detector and timer component of the preferred embodiment of the current invention.

FIG. 5 is a general block diagram of the electronics assembly 12 used in the screen-less chronograph. The electronics assembly comprises a generic timer and transmitter and can be easily constructed using a variety of industry standard components by a person reasonably skilled in electronics. As an example, the electronics assembly 12 generally comprises one, two or more signal receivers and amplifiers 60*a* and 60*b*, receiving detection signals via conductors 21*a* and 21*b*, respectively. Amplifiers 60*a* and 60*b* are further connected to start gate, or trigger 65*a* and stop gate, or trigger 65*b*, respectively, of a pulse counter 64. A high frequency oscillator or pulse generator 62 is also connected to the pulse counter 64. The recording of the continuous series of pulses 63 that it generates is controlled by the gates, or triggers, 65*a* and 65*b*. The pulse counter output is connected to a microprocessor or encoder 66. The output of the microprocessor 66 can be connected to data output or storage devices such as a data memory or other storage device 67; a printer or network output device 69; or a wireless transmitter 68 with an antenna 50. The electronic assembly 12 may also be designed using other electrical components while still accomplishing the same required functions of detecting the electrical or optical signal from the light curtain generator and detector assemblies 10*a* and 10*b* (FIG. 1) delivered through signal conductors 21*a* and 21*b*, and then recoding the amount of time passed from the moment the projectile detection signal arrives from the first light curtain to the moment another detection signal arrives from the second (or next) light curtain.

Operation—Preferred Embodiment, FIG. 1-5

In operation for the purpose of measuring the velocity of a projectile, the chronograph's light curtain generator and detector assemblies 10*a* and 10*b*, connecting rod or body 22, electronics assembly 12 and connecting conductors 21*a* and 21*b* (collectively referred to herein as "the screen-less chronograph" for the purpose of brevity) can be installed underneath, or to the side, or above the projectile path 40 (FIG. 1), with the connecting rod or arm 22 parallel or at a small angle to the barrel of firearm 23 and projectile path 40 as illustrated in FIG. 1 and FIG. 3. The degree of parallelism of the axis of the screen-less chronograph and the trajectory of the projectile will influence the accuracy of the calculated velocity, which will be biased high, inversely proportional to the cosine of the angle between the axis of the chronograph and the projectile trajectory. A human can generally recognize an angle of 1/60 of a degree by naked eye and usually can align items to approximately 2 degrees of angle without using tools. Misalignment by 2 degrees of angle would cause measurement inaccuracy of 0.06% or 2.4 ft/s for a projectile velocity of 4,000 ft/s. This level of accuracy is far better than the 0.5-4% accuracy typical for screen-based chronographs (based on the specifications provided by the industry leader, Oehler Research Inc. on http://www.oehler-research.com/specs.html), therefore the inaccuracy of velocity measurement resulting from misalignment of the chronograph and the bullet path can be neglected for most cases of practical field use.

The distance separating the projectile trajectory 40 from the screen-less chronograph installed parallel to it will in practice be approximately 0.3-1.5 m (1-5 ft) and can be smaller or greater depending on the sensitivity of the detectors 32 and the intensity of the light projected from the light curtain generators 34 (FIG. 2 and FIG. 4). Light curtain generator and detector assemblies 10a or 10b (detailed on FIG. 2) are installed a known distance L (FIG. 3) apart, in practice approximately 0.3-0.9 m (1-3 ft). Power is further applied to the light curtain generator and detector assemblies through power wires 39 (FIG. 2 and FIG. 4), so that linearly collimated light 20a and 20b is emitted from light curtain generators 34a, b and forms continuous thin curtains, or sheets, of light perpendicular to the intended projectile trajectory and parallel to each other. With present day linear laser technology these curtains can be 1-2.5 mm (0.04-0.1 inches) in thickness, and may become available in even thinner configurations as technology develops in the future. As an example in both FIG. 1 and FIG. 3 the light curtains project upwards but the direction is not relevant provided the light curtains are placed perpendicular to the projectile trajectory. The fan angle of the light curtains is not relevant for the purpose of the current invention and can range from narrow to wide without altering the current invention, as long as the light curtain crosses the estimated trajectory path of the projectile being measured. In practice the angle would likely be 30-60 degrees, which is typical for commercially available linear laser generators.

As the projectile travels along the path 40 from left to right in the example shown in FIG. 3 and FIG. 4, it intersects the entry light curtain 20a at the moment illustrated by the projectile position 42a. At this moment the projectile begins to reflect the light from the light curtain generator 20a incident upon it as a reflected light 44a. This reflected light 44a is cast in multiple directions, including onto the light curtain detector assembly 33a, mounted in the body assembly 10a (FIG. 3). The reflected light 44a falls upon the detector assembly 33a, passes through the optical filter 30, the focusing lens 31, and is projected onto the photodetector 32 (FIG. 4). The optical filter 30 only allows the same wavelength of light to reach the photodetector 32 as the wavelength of light generated by the curtain generator 34 (FIG. 2). This reduces the signal produced by the detector that may be caused by ambient light and therefore increases sensitivity of the detector to the light reflected from the projectile.

Simple calculations demonstrate that the irradiance upon a detector 4×10 mm in size, from the light generated by a red consumer 1.0 milliwatt (mW) linear laser source with a 2 mm curtain thickness and fan angle of 90 degrees, reflected from a bullet passing 0.5 m from the linear laser source, would be approximately 12.7 microwatts (uW). The irradiance upon the same sensor from the ambient light, assuming the American Society for Testing and Materials (ASTM) reference solar light intensities referenced in the standards G197 (available via www and in publications from ASTM, http://www.astm.org/Standards/G197.htm), would be on the order of 56 uW for clear sky daylight conditions and 6 mW for diffused sunlight during cloudy conditions, for the same red line of the spectrum. This means that the optical signal produced by the light from the linear laser source, reflected by the projectile will range from approximately 23% to 200% of the background signal at the detector in the absence of light reflected from the projectile, in contrast with a 0.26-0.13% signal estimated from the current shadow detecting technologies. Such a strong signal is much easier to detect accurately, and the shape of the signal would be closer to a rectangular pulse with well-defined start and end.

At the moment the reflected light from the projectile in the position 42a reaches the photodetector 33a in the entry light curtain generator and detector assembly 10a (FIG. 3), the signal from the photodetector is transmitted via the conductor 21a to the start trigger, or gate, 65a of the electronics assembly 12 (FIG. 3 and FIG. 5). The start trigger, or gate 65a issues a signal to the pulse counter 64 to initiate the counting of the pulses in pulse series 63 produced by the crystal oscillator or other pulse generator 62. At this time the pulse counter 64 begins to count the pulses 63 that are produced by the pulse generator 62.

At the moment the projectile leaves the entry light curtain 20a the start trigger, or gate 65a will close and the pulse counter 64 will send the accumulated pulse count to the microprocessor 66 but will continue counting the pulses arriving from the pulse generator 62. The pulse count transmitted during this interval to the processor corresponds to the amount of time that it took the projectile's length to pass across a single perpendicular light curtain. The amount of time the projectile was illuminated is equal to the product of the said pulse count and the known period of the accurate oscillator 62. By dividing the projectile length by this time and considering the width, or thickness, of the light curtain, the first measure of projectile velocity is obtained.

The projectile continues to travel along its path 40 until it reaches the exit light curtain 20b (FIG. 3). At this time the projectile reflects the light 44b from the light curtain 20b. This reflected light is detected by the photodetector 33b in the light curtain generator and detector assembly 10b and the signal is transmitted via the conductor 21b to the stop trigger, or gate 65b of the pulse counter 64. This signal causes the pulse counter 64 to report the cumulative pulse count to the microprocessor 66, reset the accumulated count to zero and continue to count the pulses arriving from the oscillator 62. The cumulative pulse count transmitted to the processor from the moment when reflected light 44a was first detected by the detector assembly 33a to the moment when reflected light 44b was first detected by the detector assembly 33b corresponds to the amount of time that it took for the projectile to travel the distance L from the entry light curtain 20a to the exit light curtain 20b. This amount of time can be calculated as the product of the cumulative pulse count and the known period of the oscillator 62. By dividing the distance L by this time, the second and most accurate measure of projectile velocity is obtained.

As the projectile continues to travel along its trajectory 40 it eventually leaves the exit light curtain 20b. This moment is detected by the termination of light 44b incident upon the photodetector assembly 33b in the exit assembly 10b, which sends a signal to the stop trigger 65*b* via the conductor 21*b*. Upon receiving this signal the counter 64 stops counting the pulses arriving from the oscillator 62 and sends the accumulated count to the microprocessor 66. This last pulse count corresponds to the amount of time the projectile was illuminated by the exit light curtain 20*b*. This amount of time can be calculated in the same way by multiplying the pulse count by the period of the oscillator 62. By dividing the projectile length by this time, the third measure of projectile velocity is obtained.

The microprocessor 66 stores the pulse counts and prepares the data for any or all of the following: wireless delivery using the transmitter 68 to the remote receiver 52 using radio, infrared, acoustic or other wireless signal 51; or for storage in non-volatile data memory 67; or for printing or network distribution by a printer or network device 69. Additional uses of the velocity data or the pulse count data are available at this time to be integrated into the software application used to deliver these measured quantities to the user of the chronograph.

Additional light curtain generator and detector assemblies, or assembly pairs, with corresponding electronic assemblies can be installed along the projectile trajectory path at several distances from the shooter. Each such installation would provide an independent measurement of projectile velocity at the point of installation either as a measure of the time of passage of the bullet of known length through a light curtain (in case of a single light curtain), or as the three redundant measurements of velocity (in case of a pair of light curtains) resulting from the passage of the projectile of a known length through two light curtains and across the known distance between them.

Further, in an alternate embodiment of the current invention, for multiple downrange installations of light curtain generator and detector assemblies, the electronics assemblies that collect the data from these detector assemblies could be programmed to continue counting the pulse trains at all times, thus recording pulse counts corresponding to projectile passage times between all light curtains involved. Such arrangement would provide downrange projectile velocities to the user in addition to the muzzle velocity. Muzzle velocity is the only measurement typically available to the users of the existing consumer chronographs.

Yet in another alternate embodiment the light generator and detector assemblies could be wirelessly connected to a single, centralized electronics assembly, and only transmit a signal to the start and stop triggers when a passage of a projectile is detected. The electronics assembly would comprise a centralized timing and counting circuit and could support a network of light curtains located at user-selected distances downrange. Ultimately the configuration of components in the screen-less chronograph would be chosen to maximize the simplicity and user convenience for a particular field application.

In the preferred embodiment the actual velocity calculation is performed on a remote receiver 52 (FIG. 3), which can be comprised of a desktop, laptop or tablet computer, smart telephone or similar consumer device. The software for performing this task would contain algorithms for velocity calculation as a ratio or the distance traveled over the time elapsed, and would be specifically developed and delivered to the user along with the screen-less chronograph unit. As a minimum the software would calculate the projectile passage times for the three sets of pulse counts collected by the pulse counter 66, by multiplying the number of pulses recorded by the known period of the crystal oscillator 62. Then the distance L between the light curtains 10*a* and 10*b* (FIG. 3) is divided by the resulting projectile passage time. Two or more additional measures of velocity are produced from the measures of time of projectile passage across the two (or more) light curtains by dividing projectile length by the corresponding passage times (duration of illumination of entry and exit sensors by the reflected light 44*a* and 44*b*, respectively). These measurements can augment the primary measurement and result in a more accurate overall measurement, or help indicate a potential error in the measurement.

The software would also allow the user to create groups of velocity measurements to keep the related measurements organized. The groups could be assigned a name, a date, a location and any other comments the user wishes to enter. In addition the software could calculate the statistical measures of several related velocity measurements such as extreme spread, mean absolute deviation, standard deviation and average in order to provide the user with the information necessary to compare the different kinds of ammunition he might be evaluating. Further, the software could take advantage of the bright, high resolution screen of the user's display device and present these data in a variety of formats such as a table, a graph with several bullet trajectories, a bar chart or other means that make it easy to select the ammunition that has the best performance and compare the performance of the different types of ammunition. The user could choose to view the results of the measurements on the screen; to save the chronograph measurements on a disk; to send them via E-mail; to print them out for filing; or to share them with others using distributed computing resources known as "cloud". All uses mentioned here are for example only and do not limit the scope of the current invention, which in its various embodiments may incorporate some or all of these uses and/or other uses that are not described herein.

Further, removing the processing of the time measurement and velocity calculation from the electronics assembly of the chronograph enables adding features to the user experience that would otherwise make the cost of implementation prohibitive. Programming features available on modern computing devices would enable features such as sorting the velocity measurements, saving them in a variety of formats, sending them via E-mail, storing them on remote servers, sharing them with friends, sharing them across several devices and many other uses. Bright and easily visible screens of smart phones and tablets would provide a far superior user experience than difficult to view black and white liquid crystal displays typical in most consumer chronographs available on the market presently.

Still further, performing calculations on the remote receiving device 52 allows the manufacturer of the screen-less chronograph to simplify and reduce the cost of the electronics assembly 12, and, subsequently, of the entire chronograph. A simplification of the chronograph electronics would enable higher reliability, which is important when the chronograph is used in the field and is subject to temperature and humidity changes, and may be dropped or otherwise subject to influences that can cause breaking or malfunction of overly complicated electronic circuitry.

Any laser light emitted into the open environment can be a hazard to the eye. The Occupational Safety and Health Administration (OSHA) establishes safe laser light exposure limits, and the present invention addresses this concern. The preferred embodiment of the screen-less ballistic chronograph would typically utilize low power laser sources (0.1 mW OSHA Class II or 0.1-0.5 mW OSHA Class Ma, http://www.osha.gov/dts/osta/otm/otm_iii/otm_iii_6.html).

Simple calculations demonstrate that for a 5.0 mW linear laser source with a 90 degree fan angle and 2 mm beam width, at the distance of 20 cm (8 inches) from the actual laser source, the light power density is approximately 0.00062 W/cm2. OSHA standards establish that lasers projecting light in the red part of the visible spectrum (640-650 nm wavelength, which is typical for low cost diode linear laser sources likely to be used in the preferred embodiment of the present invention) with the power density of less than 0.0025 W/cm2 are eye safe for direct beam exposure of less than 0.25 s. This means that the power density of a typical red linear laser in a preferred embodiment of a screen-less chronograph is ¼ of the safe value established by OSHA, and the screen-less chronograph would be safe for the user even if the user inadvertently looked directly into the light curtain generator aperture. Lasers in the invisible infrared part of the spectrum that also are likely to be used in the preferred embodiment of the screen-less chronograph have much greater safe exposure times established by OSHA and would be even safer if a person accidentally looked into their light source. However, to make the screen-less chronograph even safer and prevent an unpleasant feeling from eye exposure to a bright laser light, or any eye damage in case a more powerful linear laser source is used, a safety circuit could be implemented as part of the electronics assembly of the screen-less chronograph. If the user inadvertently looks into the aperture of the linear laser source, his face would enter the laser curtain before his eye would, and cause an immediate strong reflected light to fall upon the photodetector. A safety circuit could, for example, monitor the amount of time during which the reflected light from the light curtain generator is being received by the respective photodetector This safety circuit would shut down the power to the laser source if this time exceeds a preset value, for example 0.0025 s, which is $\frac{1}{100}^{th}$ of the OSHA established maximum safe direct eye exposure. This most likely would cause the laser to stop emitting the light before the eye of the user even reaches the curtain, and the user's eye will never be exposed to the laser light. The safety circuit would not disrupt the operation of the screen-less chronograph because even for the slowest moving, long projectiles (for example, a 1 inch long projectile at 900 feet per second, or 270 m/s) the time a projectile spends crossing a light curtain is limited to approximately 0.0001 s, assuming a 2 mm wide light curtain. This is a factor of 25 less time than what the safety circuit would use to detect a body part entering the light curtain, therefore the passage of the projectile is easy to distinguish electronically from a body part interference, and the safety circuit would not have any adverse effect on the normal operation of the screen-less chronograph.

Description and Operation—Alternate Embodiment

Figure 6:
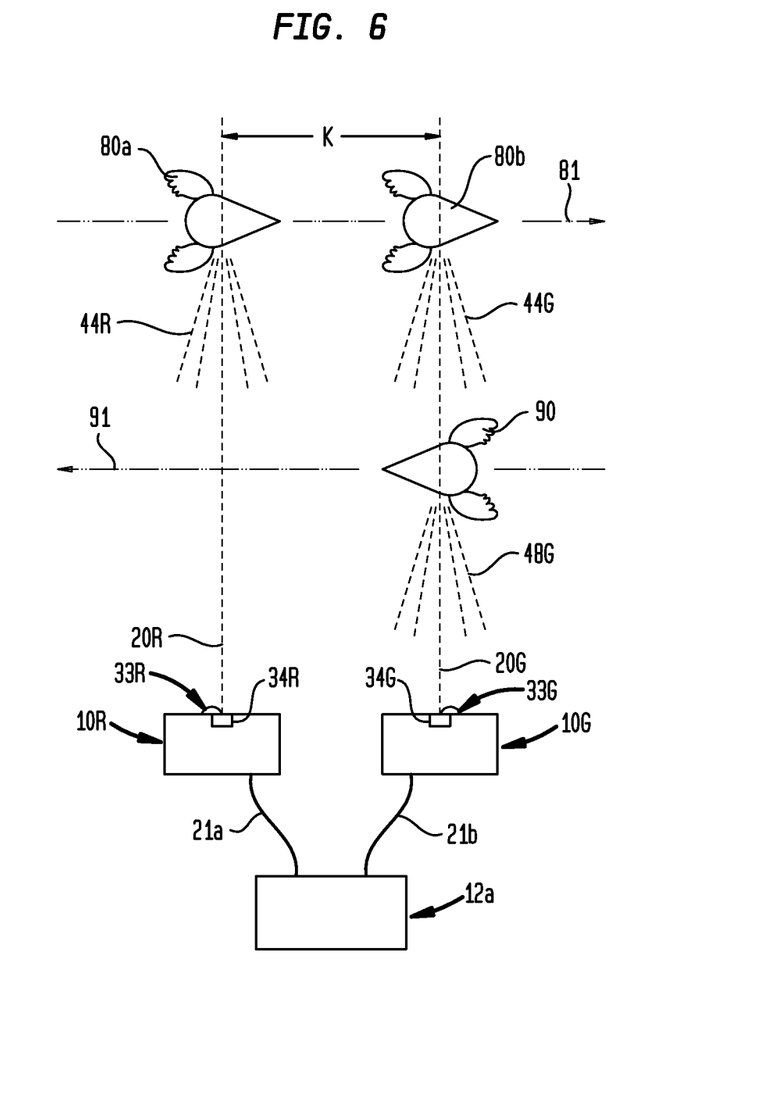
FIG. 6 is a side view of an alternative embodiment of the invention, a random flying object detector/counter, with direction of flight recognition.

FIG. 6 shows a side view of an alternate embodiment of the light curtain generator and detector assembly suitable for detecting the passage of, and recognizing the direction of motion of an unknown object.

In this alternate embodiment two or more light curtain generator and detector assemblies are used, which utilize light curtain generators with the light projected from each curtain generator being uniquely distinguishable from another, enable a user to detect the occurrence and direction of the crossing of the light curtains by randomly and unpredictably moving objects such as insects or animals. Such an embodiment would be used, for example, by a researcher to accumulate statistics on a population of bats in a cave, enabling the user to count the number of bats entering and leaving the cave by installing the light curtain assemblies in front of the cave entrance.

Yet another potential use of this alternate embodiment is to detect unauthorized objects, such as miniature flying drones or robots remotely controlled by a hostile party, which may potentially be commanded to enter a building or other secure area to gather information or cause harm. A detecting light curtain(s) may be installed in front of ventilation shaft openings, doorways or other entryways and will send a signal to security systems or personnel if a crossing by a small flying object is detected. At that time a proper response can be initiated, such as activation of mechanical shields or a vacuum suction system to eliminate the potential threat. Low cost and ease of implementation of such a system would be particularly beneficial for using of the system in many areas where this extra security measure may be desired.

The distinguishing means that would enable distinguishing of each planar light curtain generator and detector assemblies may include, but are not limited to, using a different wavelength of light in each light curtain generator and detector (this means is described in the example below and FIG. 6); or by utilizing pulse code modulation, which comprises the issuing of a unique sequence of light pulses by each light curtain generator and tuning each corresponding detector assembly to respond to that particular pulse code sequence; or by utilizing a specific light polarization in specific generator and detector assemblies; or by using other similar distinguishing methodology.

The alternate embodiment (FIG. 6) generally comprises a light curtain generator and detector body assembly 10R, which houses a light curtain generator 34R generating a particular wavelength of light (for example a Red light, or a certain wavelength of invisible infrared light), and a detector assembly 33R with a bandpass filter 31 (FIG. 2) selected for the same wavelength as the generator 34R; a light curtain generator and detector body assembly 10G, which houses a light curtain generator 34G, generating a different wavelength of light (for example, a Green light or an invisible infrared light or a different wavelength than that emitted by the generator 34R), and detector assembly 33G with a bandpass filter 31 selected for the same wavelength of light as the generator 34G; an electronics assembly 12a, similar to that described as part of the preferred embodiment of the current invention; and conductors 21a and 21b, which contain signal wiring for the detector assemblies 33R,G and power wiring for the light curtain generators 34R,G. The light curtains 20R and 20G are parallel to each other, perpendicular to the plane of the drawing and extend upward as an example but can extend in any direction. The light curtain generator and detector assemblies are constructed as shown on FIG. 2 and FIG. 4, and the electronics assembly is conceptually similar to that shown on FIG. 5. Alternatively, the body assemblies 10R and 10G can be combined into a single unit that will house the linear light generators 34R and 34G and their respective detector assemblies 33R and 33G, while maintaining their respective position shown on FIG. 6.

In the operation of the alternative embodiment (FIG. 6) the two different wavelength light curtains 20R (for example, Red in this case) and 20G (for example, Green in this case) can be positioned either an arbitrary small distance apart (for example, 1-10 cm, or 0.5-4 inches) or at a known distance K from each other and parallel to each other. As an object traveling left to right along a trajectory 81 crosses the first light curtain 20R in the position shown as the object outline 80a, the reflected light 44R is detected by its respective receiver assembly 33R located in the light curtain generator and detector assembly 10R. This reflected light 44R has the wavelength specific to the light curtain generator 34R (red in this example), and the detector installed in the assembly 33G does not respond to the reflected light 44R because its optical filter (shown as optical filter 30 in FIG. 2) only allows green light to pass through.

As the object travels further from left to right along the trajectory 81 and crosses the second light curtain 20G in the position 80b, the light 44G reflected by the object is only detected by the detector assembly 33G equipped with a filter 30 (FIG. 2) allowing only green light (in this example) to pass through. Because the optical filter in the assembly 33R only allows red light to pass through, the reflected light 44G from the light curtain 20G is not detected by the assembly 33R.

The electronics assembly 12a analyzes the signals from the detector assemblies 33R and 33G, which are received through the conductors 21a and 21b. If the signal from the assembly 33R is received first, the object 80 was traveling from the left to the right. If the signal from the assembly 33G was received first, the object was traveling from the right to the left (as shown by the example of object 90, traveling along a trajectory 91 from the right to the left, and reflecting the light 48G from the light curtain 20G, FIG. 6).

Further, if the distance K between the light curtains 20R and 20G is known then the velocity of the object crossing the light curtains can be calculated, if desired, in a way identical to that used in the preferred embodiment of the current invention, above.

The electronics assembly 12a, FIG. 6 is not described in detail here as its design would be very similar to that of the electronics assembly 12 used in the preferred embodiment and can be easily built by a person skilled in the art of electronics from commercially available components similarly to the assembly described in FIG. 5.

Operation—Other Alternative Embodiments

In another alternative embodiment one separate light curtain generator and detector assembly may be used. Such embodiment would rely on the time of the passage of projectile through the light curtain. Projectile velocity is calculated from the time of illumination of the detector by the light reflected by the projectile, and from the projectile length.

In one more alternative embodiment two, three or more light curtain generator and detector assemblies may be installed along the projectile flight path. All of such assemblies communicate wirelessly to a central microprocessor. This microprocessor can then calculate velocity and velocity changes as the projectile travels downrange.

In yet another alternate embodiment a single-plane light curtain generators illustrated in the preferred and alternate embodiments may be replaced with a cone-shaped, pyramid-shaped, or a multiple-plane shaped light curtains. These alternate light curtain geometries may improve applicability of the current invention to a particular user implementation in an equivalent way to practice the current invention.

The terms "shape" and "form" are used interchangeably herein.

While a particular embodiment of the invention has been described and disclosed in the present application, it is clear that any number of permutations, modifications, or embodiments may be made without departing from the spirit and the scope of this invention. Accordingly, it is not the inventor's intention to limit this invention in this application, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

In light of the above "Detailed Description," Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

I claim:

1. An apparatus for detecting passage of a ballistic object in three-dimensional space through a plurality of thin light sheets, said apparatus comprising:

a plurality of photo projectors wherein each of said photo projector is mounted on a side of a housing and generates a projection of light in a form of a thin light sheet, wherein said photo projectors are oriented substantially parallel and do not overlap, wherein said projections of light are oriented substantially parallel and do not overlap;

one or more photo detectors for detecting a reflection of light generated by a ballistic object crossing the projections of light, wherein each said photo detector is mounted on said side of said housing and is positioned proximately to and oriented substantially unidirectional with one of said photo projectors, wherein the photo detector generates a data set indicating the detection of the reflection of light, wherein said ballistic object traverses substantially perpendicular to said projections of light and does not traverse substantially proximate to and in between said photo projectors and said photo detectors;

wherein said photo projectors and said projections of light are stationary in relation to said ballistic object;

one or more signal processors for receiving the data set from the photo detector, for generating velocity properties of the ballistic object, for distinguishing each said thin light sheet from each other said thin light sheet, and for analyzing the data set to determine direction of motion of the ballistic object;

a receiver connected to the signal processor via a connection, wherein the data set identifying order in which said thin light sheets were crossed by said ballistic object is generated and output; and wherein the connection is a wireless connection.

2. The apparatus of claim 1, wherein the receiver is selected from the group consisting of a computer, a smartphone, a tablet computer, and a display screen.

3. The apparatus of claim 1, wherein the photo detector and the photo projectors are contained in a single assembly.

4. The apparatus of claim 1, wherein the form of a thin light sheet is selected from a group consisting of a single flat plane, multiple flat planes, a cone, and a pyramid.

5. The apparatus of claim 1, wherein:
the form of a thin light sheet of the projections of light from said apparatus crosses the path of the ballistic object being identified;
said projections of light are distinguishable and uniquely identifiable to said apparatus;
the photo detector of said apparatus generates a signal caused by the ballistic object crossing the projections of light of said apparatus;
the signal processor distinguishes which apparatus generated the signal first;
the receiver receives information about the order of the signals received by the signal processor; and
the receiver further processes the information about the order of the signals received to generate the information about the direction of travel of said ballistic object.

6. The apparatus of claim 1, wherein the connection further comprises a wired connection.

7. The apparatus of claim 1, wherein the wireless connection is selected from the group consisting of a 802.1 wireless connection and a IEEE 802.15.1 wireless connection.

8. The chronograph of claim 1, further comprising one or more amplifiers, wherein said amplifier intensifies signals generated from detecting said reflection of light.

9. The chronograph of claim 1, further comprising an optical bandpass filter for allowing wavelengths of light reaching said photo detector to be substantially similar to wavelengths of light generated by said photo projectors, wherein said optical bandpass filter is located between said ballistic object and a focusing lens.

10. The apparatus of claim 1, wherein said detection of the reflection of light generates an increase in voltage or current within said data set.

11. A chronograph for measuring movement of a non-proximate ballistic projectile, said chronograph comprising:
a plurality of photo projectors wherein each of said photo projector is mounted on a side of a housing and generates a projection of light in a form of a thin light sheet, wherein said photo projectors are oriented substantially parallel and do not overlap, wherein said projections of light are oriented substantially parallel and do not overlap;
wherein a reflection of light is generated as a ballistic projectile passes through the form of a thin light sheet and can be detected by one or more photo detectors, and an electronics assembly, wherein said ballistic projectile traverses substantially perpendicular to said projections of light and does not traverse substantially proximate to and in between said photo projectors and said photo detectors, wherein each said photo detector is mounted on said side of said housing and is positioned proximately to and oriented substantially unidirectional with one of said photo projectors;

wherein said photo projectors and said projections of light are stationary in relation to said ballistic projectile;

wherein each said photo detector comprises a focusing lens and an optical bandpass filter responsive to the reflection of light, for measuring a data set created by said ballistic projectile passing through said form of a thin light sheet;

wherein each said photo detector is connected to a signal processor, and the signal processor distinguishes each of said thin light sheets from each other of said thin light sheets, analyzes the data set to determine direction of motion of said ballistic object, and outputs the data set to a receiver that interfaces with the signal processor via an interface and identifies order in which said thin light sheets were crossed by said ballistic projectile; and wherein the interface is a wireless connection.

12. The chronograph of claim 11, wherein the receiver is selected from the group consisting of a computer, a smartphone, a tablet computer, and a display screen.

13. The chronograph of claim 11, wherein the photo detector and the photo projectors are contained in a single assembly.

14. The chronograph of claim 11, wherein the form of a thin light sheet is selected from the group consisting of a single flat plane, multiple flat planes, a cone, and a pyramid.

15. The chronograph of claim 11, wherein:
the photo projectors are organized in such a way that their respective projections of light may be crossed by the ballistic projectile from a substantially perpendicular orientation;
the projections of light emitted from the photo projectors are distinguishable and uniquely identifiable to each of the photo projectors;
each said photo detector is able to distinguish which of said projections of light was crossed, and transmit this data to the signal processor;
the signal processor distinguishes which said projection of light was crossed by the ballistic projectile first, and of transmitting information about order of signals to the receiver; and
the receiver receives the information about order of signals received by the signal processor, and of determining the direction of flight of the ballistic projectile from the information received.

16. The chronograph of claim 11, wherein the interface further comprises a wired connection.

17. The chronograph of claim 11, wherein the wireless connection is selected from the group consisting of a 802.1 wireless connection and a IEEE 802.15.1 wireless connection.

18. A method for detecting passage of an object through a plurality of sheets of light in space, comprising the steps of:
projecting a plurality of sheets of light, in a direction crossing a path of an object, wherein said path is substantially perpendicular to said sheets of light, wherein said sheets of light are oriented substantially parallel and do not overlap;

detecting reflected light from said object via one or more photo detectors;
wherein said sheets of light are stationary in relation to said object;
electronically amplifying one or more signals generated from detecting the reflected light;
transmitting said signal(s) to a signal processor;
receiving said signal(s) from the signal processor via a wireless connection;
generating data that describes the path of the object;
distinguishing each of said sheets of light from each other of said sheets of light using a distinguishing means;
identifying order in which the sheets of light were crossed by the object, using the distinguishing means of the reflected light;
analyzing the result using the signal processor to determine a direction of motion of said object; and
transmitting the direction of motion of said object to a receiver for recording or display.

19. The method of claim 18, further comprising the steps of:
recording an interval of time between detection(s) of the reflected light via the signal processor; and
computing velocity of the object as a ratio of distance between the corresponding projections of light to the recorded interval of time.

20. The method of claim 18, further comprising the step of:
filtering reflected light to remove wavelengths of light not present in the sheets of light.

* * * * *